United States Patent
Fee et al.

(10) Patent No.: US 10,397,619 B2
(45) Date of Patent: Aug. 27, 2019

(54) CAMERA DATA RETENTION USING UPTIME CLOCKS AND SETTINGS

(71) Applicant: Sensormatic Electronics, LLC, Boca Raton, FL (US)

(72) Inventors: Paul Fee, Belfast (GB); Simon Logan, Bangor (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/807,101

(22) Filed: Nov. 8, 2017

(65) Prior Publication Data

US 2019/0141362 A1 May 9, 2019

(51) Int. Cl.
| | |
|---|---|
| *H04N 21/231* | (2011.01) |
| *G08B 13/196* | (2006.01) |
| *H04N 7/18* | (2006.01) |
| *G06F 16/22* | (2019.01) |
| *G06F 16/27* | (2019.01) |
| *G06K 9/00* | (2006.01) |

(52) U.S. Cl.
CPC ....... *H04N 21/23113* (2013.01); *G06F 16/22* (2019.01); *G06F 16/275* (2019.01); *G06K 9/00771* (2013.01); *G08B 13/19665* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 9,374,405 | B2 * | 6/2016 | Marchese | G06F 17/3025 |
| 2008/0309759 | A1 * | 12/2008 | Wilson | G08B 13/1968 348/143 |
| 2012/0206606 | A1 * | 8/2012 | Marchese | G06F 17/3025 348/159 |
| 2016/0086069 | A1 * | 3/2016 | Tajima | G06F 8/654 358/1.14 |
| 2016/0163245 | A1 * | 6/2016 | Mu | G09G 3/20 345/212 |
| 2016/0227235 | A1 * | 8/2016 | Frishman | H04N 19/172 |
| 2017/0300758 | A1 * | 10/2017 | Renkis | H04N 7/181 |
| 2018/0181836 | A1 * | 6/2018 | Xie | G06K 9/00771 |

* cited by examiner

*Primary Examiner* — Cynthia Segura
(74) *Attorney, Agent, or Firm* — HoustonHogle LLP

(57) ABSTRACT

A surveillance camera and surveillance data management system includes a video management system with a data retention module for determining when surveillance data is deleted. Blocks of the surveillance data are deleted based on the ages of the blocks, which are calculated based on the difference between a recorded start date for each block and the current time and adjusted to subtract durations of periods of system downtime that occurred since the start date. The ages are also calculated using a counter, which is initialized to a predetermined value for each block and incremented or decremented only during uptime. In another embodiment, an override module determines an override status based on input from an interface, which can include a physical switch or a keyboard, mouse and display, and returns the override status. No surveillance data is deleted when the override status is true.

19 Claims, 12 Drawing Sheets surveillance data store 220

250
events table

| event ID | type | block ID | camera ID | time |
|---|---|---|---|---|
| 0001 | RecordStart | block01 | camera1 | time1 |
| 0002 | RecordStart | block02 | camera2 | time2 |
| 0003 | RecordStart | block03 | camera3 | time3 |
| 0004 | RecordStart | block04 | camera4 | time4 |
| 0005 | RecordStart | block05 | camera1 | time5 |
| 0006 | RecordStart | block06 | camera2 | time6 |
| 0007 | RecordStart | block07 | camera3 | time7 |
| 0008 | RecordStart | block08 | camera4 | time8 |
| 0009 | OutageStart | - | - | time9 |
| 0010 | OutageStop | - | - | time10 |

FIG. 2

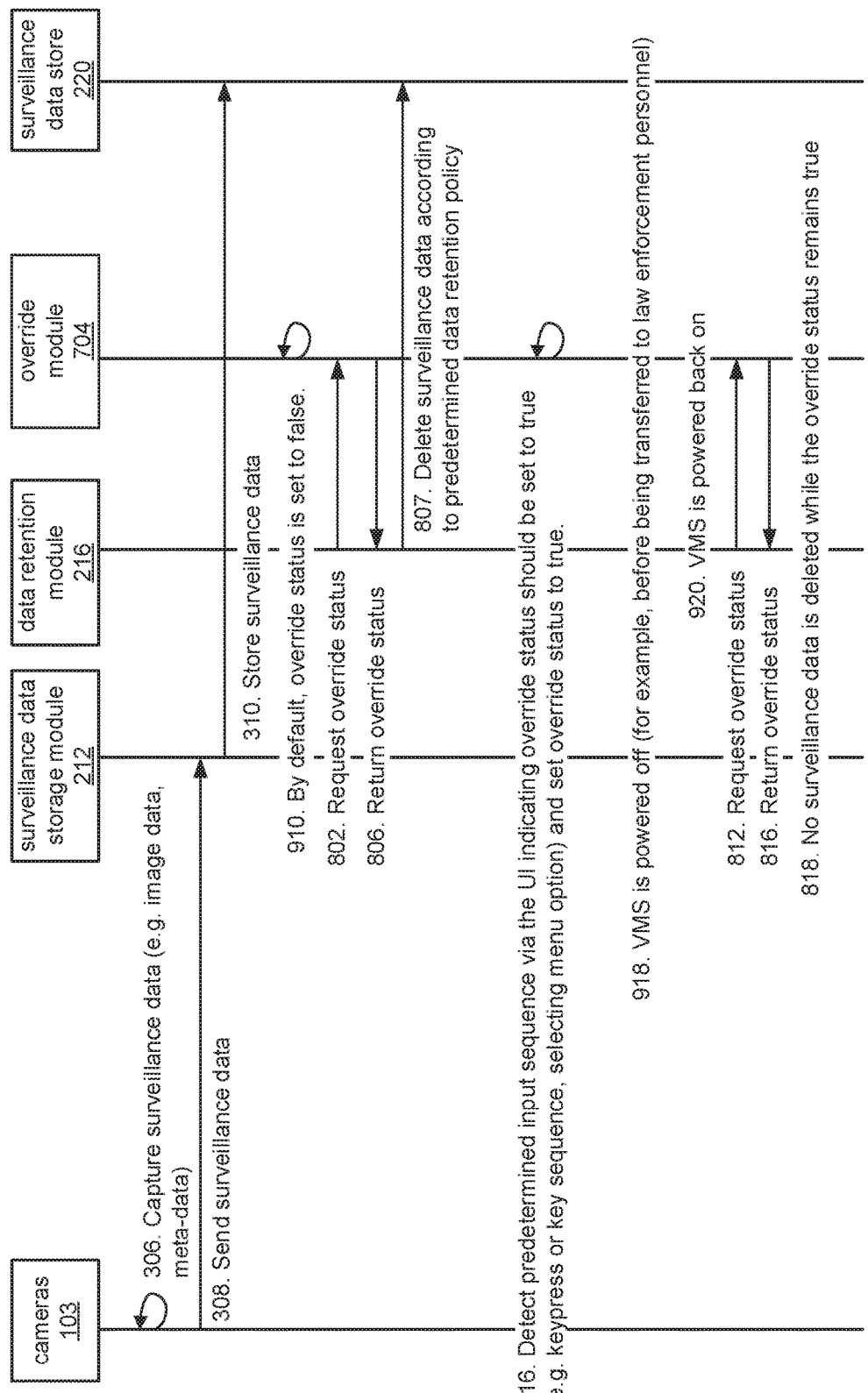

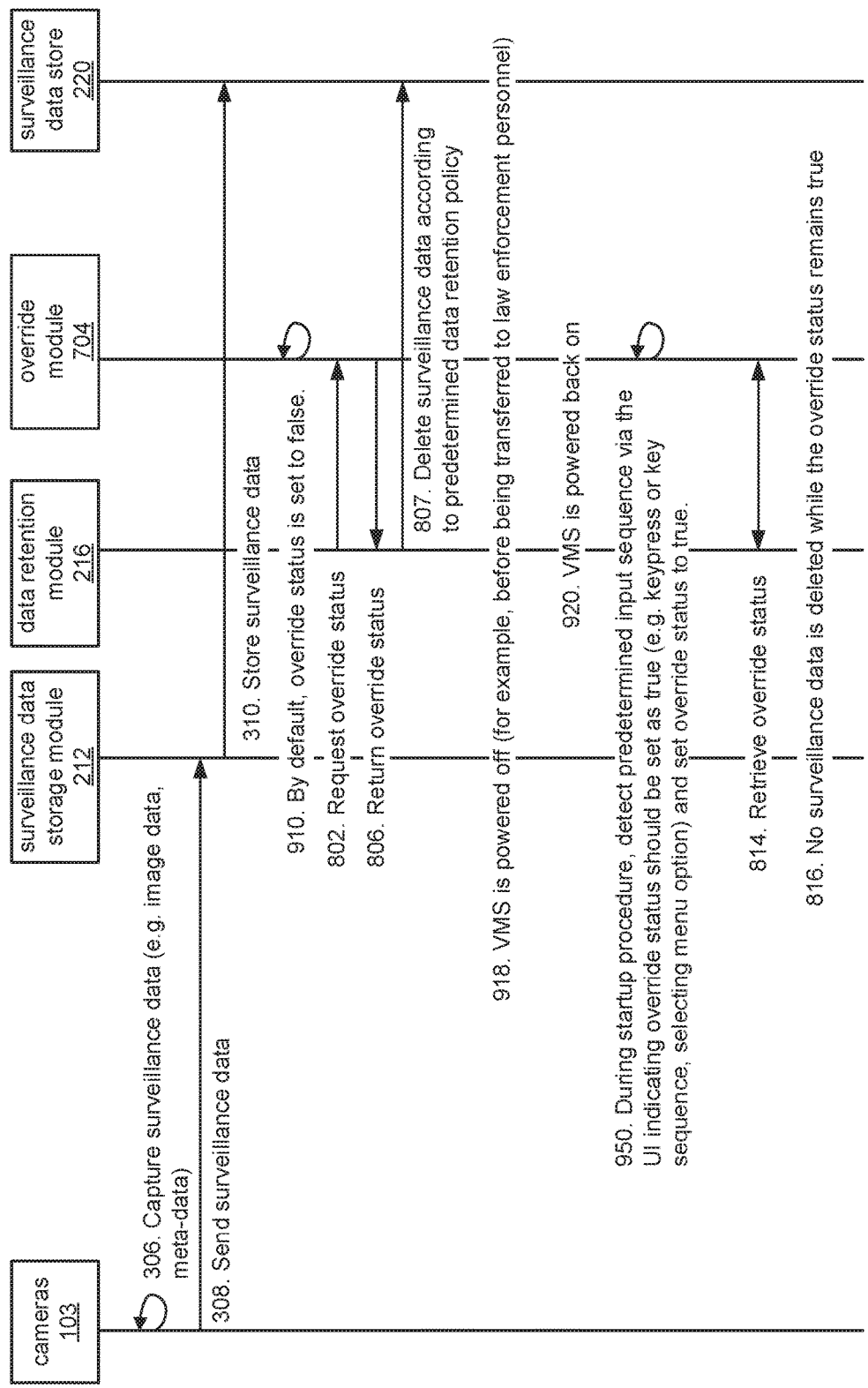

CAMERA DATA RETENTION USING UPTIME CLOCKS AND SETTINGS

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, multi dwelling units, roads and highways, and town and city centers.

Historically, surveillance camera systems were often proprietary/closed-standards systems. Surveillance cameras were directly wired to a local video management system and surveillance image data, e.g., captured audio and video data and/or meta-data from the cameras, were compiled into matrix views for real time viewing at possibly a security guard station or back office video monitor. Each camera typically required significant installation time and adjustment because of their "hard wired" connection. In addition, the local video management system was typically a video cassette recorder (VCR) located in a network room or the back office within the premises being monitored.

More recently, internet protocol (IP) surveillance cameras have become increasingly common. These cameras utilize standard protocols over wired and/or wireless networks. The surveillance data, which typically includes image and audio data along with metadata, is sent for storage to possibly a video management system (VMS) and monitors for displaying image data such as video from the security cameras. The VMS often includes a storage system for continuously recording the surveillance data for future access.

SUMMARY OF THE INVENTION

Storage systems for video management systems often rely on local storage. Since this storage is finite, surveillance data cannot be stored indefinitely. As a result, these systems often implement data retention policies, which include, for example, the length of time surveillance data will be stored before it is deleted. In one example, if not configured, the system will record until storage is full and then delete the oldest data to make way for new recordings. However, systems may also be configured to retain surveillance data for a fixed period of time, even though they might have sufficient storage to retain the surveillance data for longer periods of time.

Systems with specific retention periods use conventional clock time, or "wall clock time", to determine when the surveillance data should be deleted. For example, if data retention is set to seven days, then surveillance data older than seven days is deleted.

This approach can become problematic if the VMS is powered-off for a period of time (for example, if the VMS is seized as part of a law enforcement investigation). If data retention is set to seven days, and the VMS is powered-on after two weeks, then all recorded surveillance data is considered older than the seven day retention setting and hence is deleted immediately upon powering-up the system.

To avoid this, those in possession of the VMS must take a backup of the hard drives without powering-on the unit. This is inconvenient and assumes knowledge of how data retention works. There is a high risk of data loss should the unit be turned on without first taking these precautions.

The current invention avoids unintentional data loss by providing additional means of controlling when and how data retention policies are executed by the VMS.

According to one embodiment, the VMS maintains an uptime clock, which ticks forward or advances only when the unit is powered-on, allowing data retention to work in the normal way when the unit is powered-on but to nonetheless avoid data loss after periods of downtime, during which the uptime clock remains frozen. For example, if the retention period is set to seven days, and there are no periods of downtime, the surveillance data will be deleted after seven days. On the other hand, if the retention period is set to seven days, and the unit is powered-off for several weeks, upon restoration of power to the unit, the surveillance data will be deleted only after seven days of uptime are recorded, rather than immediately.

Additionally, there may be scenarios where wall clock based data retention is still required. For those cases the VMS, according to another embodiment of the present invention, is configured to use wall clock time rather than an uptime clock. When blocks (representing, for example, an hour of surveillance data) are stored by the VMS, a starting time is recorded for each block. Starting and ending times are also recorded for periods of downtime and/or outages. As before, the surveillance data is deleted when it reaches a certain age, but the system adjusts the age of the surveillance data to account for any periods of downtime that were recorded (for example, by subtracting the durations of periods of downtime from the total age of the surveillance data).

Another embodiment relies on an override status of the VMS, which indicates whether any surveillance data should be deleted, regardless of the data retention settings. For example, an override status of true indicates that no data should be deleted as long as the status remains true.

The override status can be set via a user interface of the VMS, which can include an override switch, which is a physical switch on the outside of the VMS, or other components such a keyboard and mouse and/or a graphical user interface rendered on a display connected to the VMS. In the latter example, input sequences indicating that the override status should be set are detected, including different predetermined combinations of keystrokes, or navigating through a menu system of a GUI, among other examples.

In one example, the VMS is powered-off before being transferred to law enforcement personnel for an extended duration of time. Before the VMS is transferred, the override switch is toggled to set the override status as true. In a similar example, during a shutdown process of the VMS before it is powered-off, a predetermined sequence of keystrokes is detected indicating that the override status should be set as true. In yet another example, after the VMS is transferred, during a startup process, a predetermined sequence of keystrokes is detected indicating that the override status should be set as true. In each of these examples, when the VMS is powered-on, no surveillance data is deleted, regardless of the data retention settings, because the override status was set as true before any surveillance data could be deleted.

In general, according to one aspect, the invention features a surveillance data management system, including a surveillance data store for storing surveillance data from one or more surveillance cameras and a storage server for directing storage of the surveillance data in the surveillance data store. The storage server generates age information of the surveillance data based on an operational status of the surveillance data management system and discards the surveillance data based on the age information.

In one embodiment, the age information includes adjusted ages for the surveillance data based on differences between actual ages for the surveillance data and durations of downtime of the surveillance data management system. The actual ages for the surveillance data are determined based on when the surveillance data was generated. The durations of downtime of the surveillance data management system are determined based on when the most recent surveillance data was generated, when a current period of uptime started, when entries in a log were recorded, when recent graceful shutdowns occurred, and/or when a module for tracking the operational status last confirmed an uptime status. The storage server discards the surveillance data with the adjusted ages greater than a predetermined value.

In another embodiment, the age information is stored in counters for the surveillance data. The counters are set with predetermined default values when the surveillance data are first stored in the surveillance data store. The storage server increments or decrements the counters at predetermined intervals during periods of uptime and discards the surveillance data based on comparisons of the counters to a predetermined value.

The surveillance data typically includes image data, audio data, and/or meta-data.

In general, according to another aspect, the invention features a method for managing storage of surveillance data of a surveillance data management system. Surveillance data from one or more surveillance cameras are stored, and age information of the surveillance data is generated based on an operational status of the surveillance data management system. The surveillance data is then discarded based on the age information.

In general, according to another aspect, the invention features a surveillance data management system, comprising a surveillance data store for storing surveillance data from one or more surveillance cameras and a storage server for directing storage of the surveillance data in the surveillance data store. The storage server discards the surveillance data based on ages of the surveillance data and based on an override status of the surveillance data management system. The override status is set from a user interface of the surveillance data management system.

In embodiments, the user interface includes a physical switch, and the override status is based on a status of the physical switch.

In general, according to another aspect, the invention features a method for managing storage of surveillance data of a surveillance data management system. Surveillance data from one or more surveillance cameras is stored and then discarded based on ages of the surveillance data. However, the discarding of the surveillance data is disabled in response to an override status, which is set from a user interface of the surveillance data management system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 is schematic diagram of the surveillance data store showing how time information for the surveillance data and the operational status of the VMS is stored, according to one embodiment of the present invention;

FIG. 10 is a sequence diagram illustrating how the storage server stores the surveillance data and discards the surveillance data based on whether a predetermined input sequence is detected via the UI before the VMS is powered-off; and FIG. 11 is a sequence diagram illustrating how the storage server stores the surveillance data and discards the surveillance data based on whether a predetermined input sequence is detected during a startup process of the VMS.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
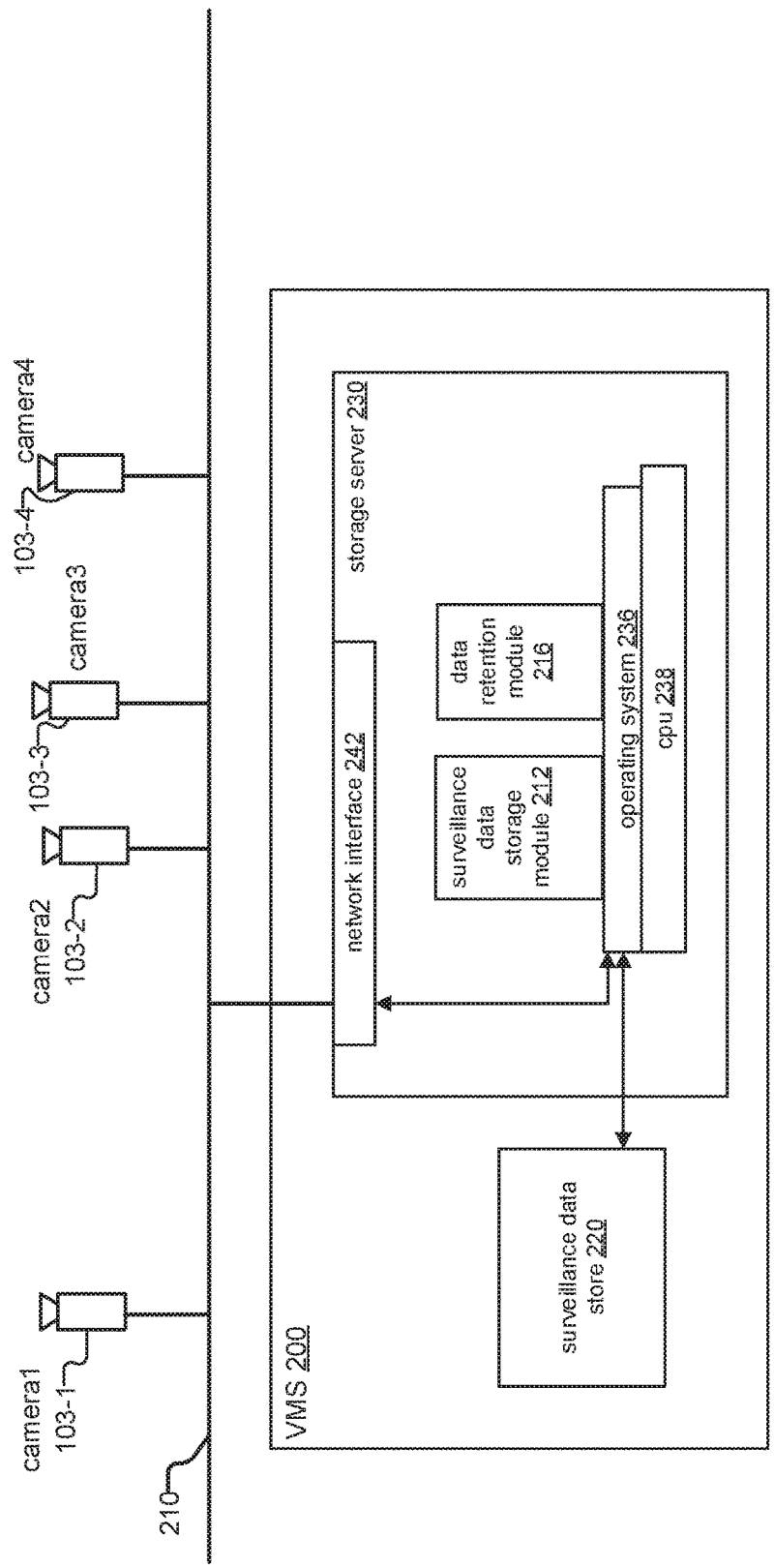
FIG. 1A is a schematic diagram showing surveillance cameras and a video management system (VMS) to which the present invention is applicable.

FIG. 1A is a schematic diagram of a video management system (VMS) 200 to which the present invention is applicable.

In general, the VMS 200 is a surveillance data management system for storing surveillance data. The surveillance data includes captured video and/or other forms of image data, captured audio data, and meta-data, such as date and time information and video analysis information such as security events, among other examples.

The VMS 200 receives image data from one or more surveillance cameras 103. The associated meta-data can be generated by the surveillance cameras 103 and/or the VMS and/or a separate video analytics system. The surveillance data, including the image and meta data, is stored by the VMS 200 and can be accessed by workstations and mobile user devices such as smartphones, tablet computing devices, laptop computer running operating systems such as Windows®, Android™, Linux®, or iOS®, in examples.

In general, the surveillance cameras 103 generate surveillance data and transfer the surveillance data to the VMS 200. Generally, the surveillance cameras are installed at a premises of an organization. The premises might be a building or other structure, and the cameras 103 could generate surveillance data, including captured image data, captured audio data, and/or meta-data, both from inside the building or structure or from the areas surrounding the building or structure.

The surveillance cameras 103 communicate with each other and with the VMS 200 over a local network 210, which can be a wired and/or wireless local area network using the internet protocol (IP). Other security devices (not illustrated) could also be located on the local network 210, including sensor devices such as motion detectors, LED lights, and relays or contact switches, in examples.

In the illustrated example, camera1 103-1, camera2 103-2, camera3 103-3, and camera4 103-4 connect to the VMS 200 via the local network 210. In other embodiments, the VMS 200 could be a surveillance data management system for only a single surveillance camera 103, or a management system that is part of a surveillance camera 103 that has its own integrated and/or dedicated surveillance data store.

In the illustrated example, the VMS 200 includes a storage server 230 and a surveillance data store 220. The surveillance data store 220 stores the surveillance data and can be internal or attached to the storage server 230. The storage server 230 is typically an application server of the VMS 200 that generally manages the storage of and access to the surveillance data in the surveillance data store 220 and also deletes or overwrites surveillance data as it becomes stale. The storage server 230 includes a CPU 238 and a network interface 242. An operating system 236 executes on top of the CPU 238, and several processes execute on top of the operating system 236, including a surveillance data storage module 212 and a data retention module 216.

In general, the surveillance data storage module 212 manages storage of surveillance data in the surveillance data store 220 during normal operation of the VMS 200, and the data retention module 216 discards the surveillance data based on the age of the surveillance data, which is adjusted based on an operational status (e.g. uptime, downtime) of the VMS 200.

Figure 1B:
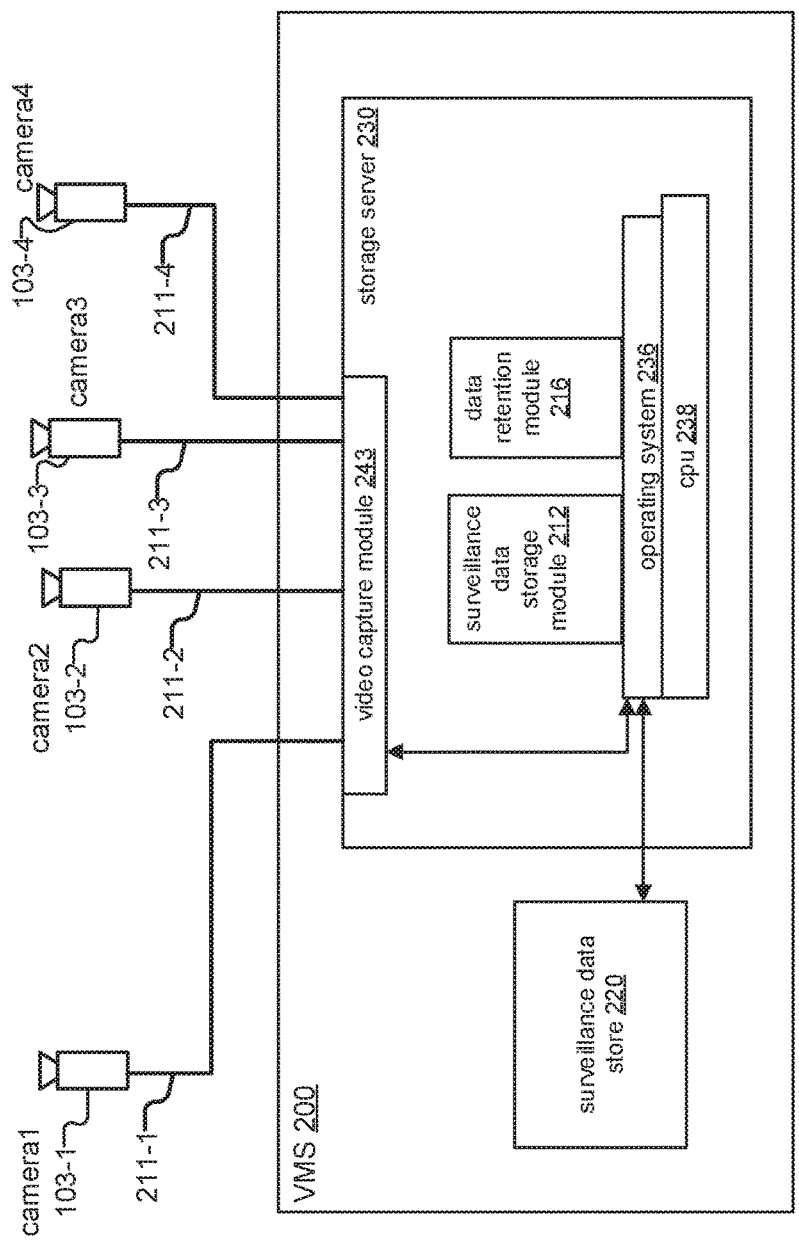
FIG. 1B is a schematic diagram of another embodiment of the VMS, including analog surveillance cameras.

FIG. 1B is a schematic diagram of another embodiment of the VMS 200, in which analog surveillance cameras 103 connect to and transfer surveillance data to the VMS 200. This embodiment is similar to that of FIG. 1A. Now, however, analog surveillance cameras 103 connect individually to the VMS 200 via a video capture module 243 of the storage server 230 and individual analog connections 211, which can include BNC, DIN, and RCA cables, among other examples. In the illustrated example, camera1 103-1, camera2 103-2, camera3 103-3, and camera4 103-4 connect to the video capture module 243 via individual connections 211-1, 211-2, 211-3, and 211-4, respectively.

FIG. 2 is schematic diagram of the surveillance data store 220 showing how time information for the surveillance data and the operational status of the VMS 200 is stored, according to one embodiment of the present invention.

In general, the surveillance data store 220 stores the surveillance data and time information associated with either the surveillance data itself or the operational status of the VMS 200. The time information is then used to generate age information for the surveillance data, including actual ages of the surveillance data and adjusted ages, which are adjusted based on the operational status of the VMS 200.

More specifically, the surveillance data is divided into blocks, which represent segments of recorded surveillance data (for example, an hour or less in length). In other examples, the blocks have a fixed data size, such as a megabyte. Each block will hold a varying amount of surveillance data depending on the image resolution, the efficiency with which it was compressed, and other factors. Each block of surveillance data is associated with the surveillance camera 103 that generated the surveillance data, and many blocks of surveillance data can be stored for each surveillance camera 103.

For each block of surveillance data, a recording start time is also stored. The recording start time represents the time when the surveillance data was first generated or stored and is recorded with respect to real time, or wall-clock time.

Similarly, start and stop times for periods of downtime (during which the VMS 200 is either powered-off or otherwise not functioning) are stored. The start and stop times can be determined based on when the most recent surveillance data was generated, when a current period of uptime started, when entries in a log were recorded, when recent graceful shutdowns occurred, and/or when a module for tracking the operational status last confirmed an uptime status, among other examples. Durations of downtime are determined based on these start and stop times.

The data retention module 216 uses the time information to calculate the actual and adjusted ages for blocks of surveillance data. The actual age is calculated based on a comparison between the current wall-clock time and the recording start time that was stored for each block (for example, taking the difference between the current time and the recording start time). The adjusted age is calculated based on the difference between the actual age and the durations of downtime (for example, by subtracting durations of downtime from the actual age).

In the illustrated embodiment, the time information for the surveillance data and the periods of downtime are combined and stored in an events table 250, where "events" include either the recording of a new block of surveillance data or the beginning or ending of a period of downtime. Time information (e.g. timestamps) associated with each event represent when the particular block of surveillance data was generated and/or stored and when the period of downtime started and/or stopped.

The events table 250 includes columns for event ID, type, block ID, camera ID, and time. The event ID, block ID, and camera ID represent unique identifiers for the event, an associated block of surveillance data, and an associated surveillance camera 103, respectively. The time column includes the timestamps associated with each event. The type indicates whether the timestamp is associated with the recording of a new block of surveillance data or with a period of downtime, and further whether the timestamp represents the starting time or ending time of the period of downtime.

In the illustrated example, the event with an event ID of "0001" represents the recording start time for a particular block of surveillance data with a block ID of "block01", which was generated by "camera1", with a timestamp of "time1" indicating when the block was generated or stored.

Figure 3:
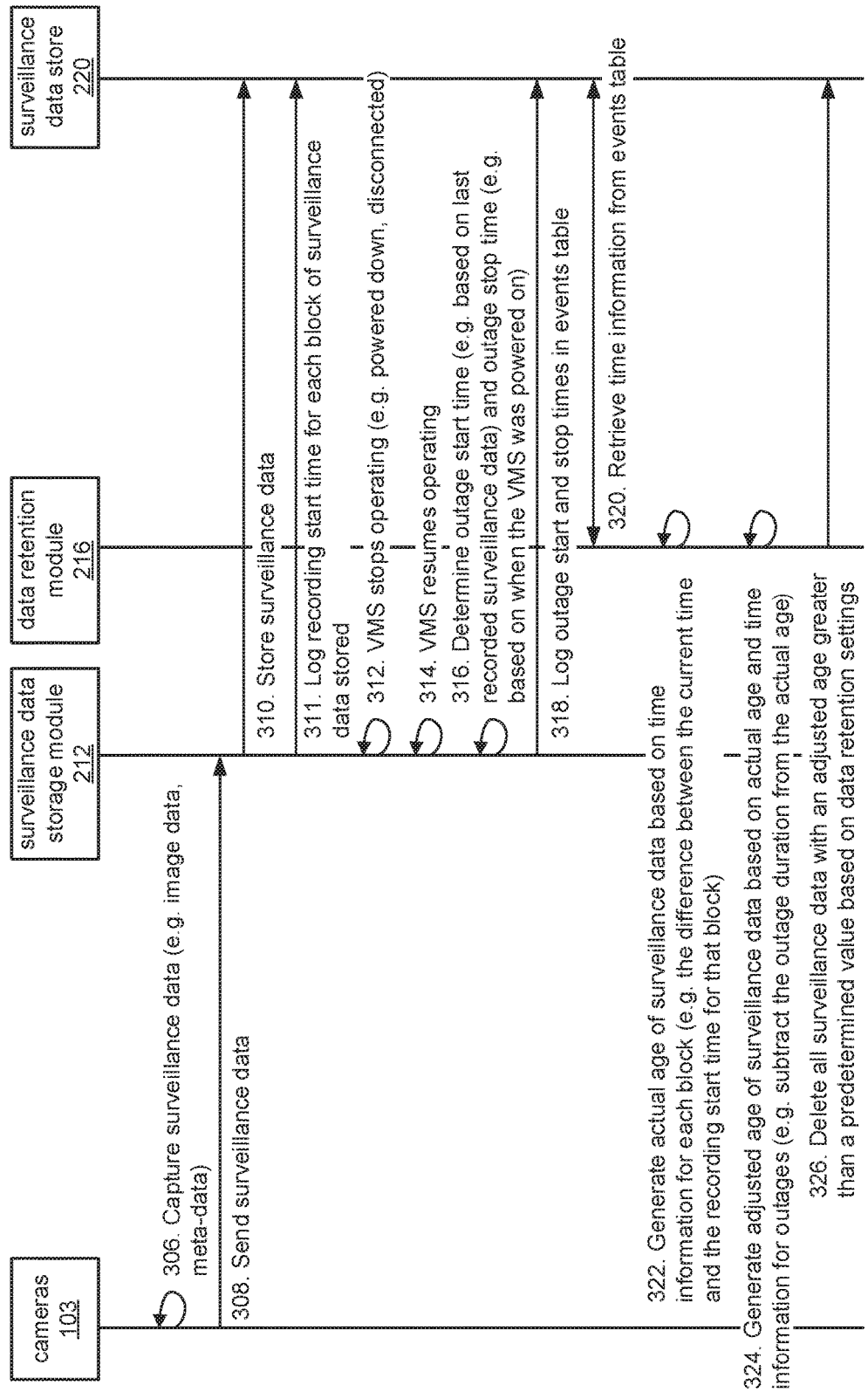
FIG. 3 is a sequence diagram illustrating how the storage server stores the surveillance data, calculates and adjusts the age of the surveillance data, and discards the surveillance data based on the adjusted age and predetermined data retention settings.

FIG. 3 is a sequence diagram illustrating how the storage server 230 stores the surveillance data, calculates and adjusts the age of the surveillance data, and discards the surveillance data based on the adjusted age and predetermined data retention settings in response to having its power cycled.

In step 306, the surveillance cameras 306 generate surveillance data (for example, by capturing image, video and audio data, and generating meta-data). The surveillance cameras 103 then send the surveillance data to the surveillance data storage module 212 of the VMS 200 in step 308, via the local network 210 or individual analog connections 211.

In step 310, the surveillance data storage module 212 stores the surveillance data in the surveillance data store 220 divided into blocks based on lengths of segments of the captured surveillance data. Additionally, in step 311, the surveillance data storage module 212 logs recording start times for each block of surveillance data, for example, by storing the recording start times in the events log 250.

In step 312, the VMS 200 stops operating (e.g. because it has been powered-down or disconnected from the surveillance cameras 103). In one example, the VMS 200 is powered-down in anticipation of transferring it to law enforcement personnel related to an investigation in which the surveillance data is relevant.

In step 314, the VMS 200 resumes operating.

In step 316, the surveillance data storage module 212 detects that an outage (or period of downtime) has occurred and determines the start time of the downtime (e.g. based on the last recorded surveillance data) and the stop time of the downtime (e.g. based on when the VMS 200 was powered-on most recently). In step 318, the surveillance data storage module 212 logs the downtime start and stop times, for example, in the events table 250.

In step 320, the data retention module 216 retrieves the time information from the events table 250, including the recording start times and the start and stop times for periods of downtime.

In step 322, the data retention module 216 determines the actual age of each block of surveillance data based on the time information associated with each block. In one example, the data retention module 216 calculates the difference between the current time and the recording start time to determine the actual age of the block of surveillance data.

In step 324, the data retention module 216 determines the adjusted age of each block of surveillance data based on the actual ages and the time information for periods of downtime that have occurred. In one example, the data retention module 216 calculates a total duration of all downtime since the recording start time for each block and subtracts the duration from the actual age of each block in order to determine the adjusted age. In the cases of multiple periods of downtime, the cumulative duration of all periods of downtime is used.

Finally, in step 326, the data retention module 216 deletes all of the surveillance data with an adjusted age greater than a predetermined value based on data retention settings for the VMS 200.

Figure 4:
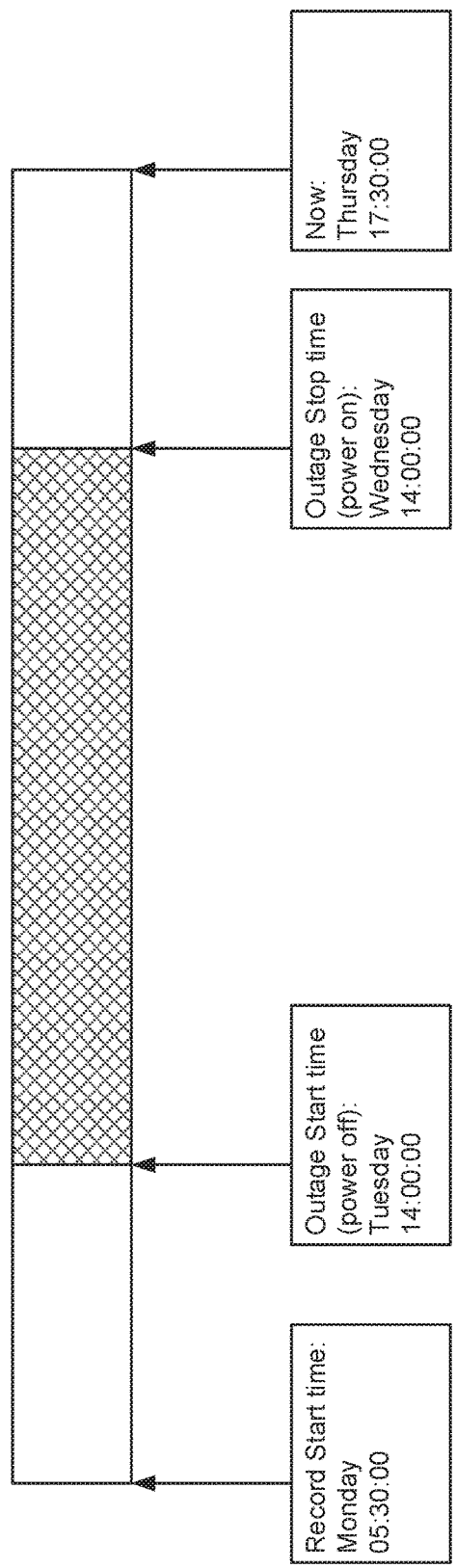
FIG. 4 is a diagram of an exemplary timeline showing how the actual age of the surveillance data is adjusted based on the cumulative duration of outage(s)

FIG. 4 is a diagram of an exemplary timeline showing how the actual age of the surveillance data is adjusted based on the duration of an outage.

In the illustrated example, a recording start time is recorded for Monday at 05:30:00 for a particular block of surveillance data. An outage start time is recorded for Tuesday at 14:00:00. Subsequently, an outage stop time is recorded for Wednesday at 14:00:00. Finally, the current time (e.g. the time at which the calculation of the age of the block of surveillance data is occurring) is indicated as Thursday at 17:30:00.

In this example, the actual age would be calculated as the amount of time elapsed between the recording start time and the current time, which is three and a half days. This amount is represented in the illustration by the total length of the timeline.

The duration of the outage can also be determined based on the difference between the outage start time and stop time, which is one day. This duration is represented in the illustration by the shaded region of the timeline between the start and stop times of the outage.

The adjusted age is calculated by subtracting the duration of the outage, which is one day, from the actual age, resulting in an adjusted age of two and a half days. This is represented in the illustration by the non-shaded region of the timeline.

Although the illustrated example includes only one outage, in the case of multiple outages, the cumulative time of all outages is used.

Figure 5:
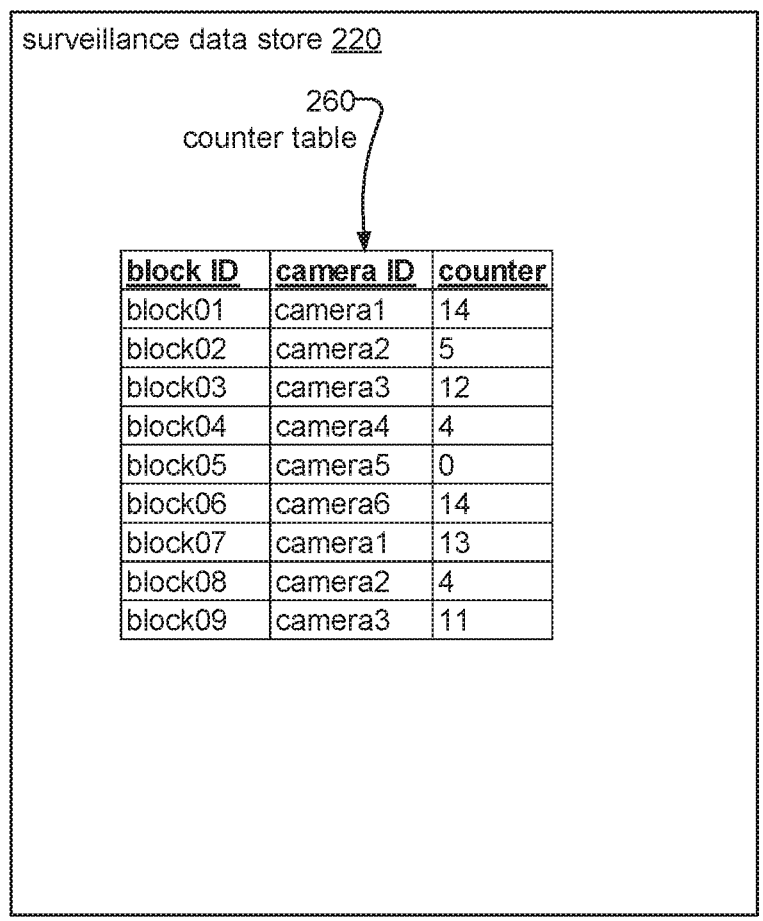
FIG. 5 is a schematic diagram of the surveillance data store showing how time information for the surveillance data and the operational status of the VMS is stored, according to another embodiment of the present invention.

FIG. 5 is a schematic diagram of the surveillance data store 220 showing how time information for the surveillance data and the operational status of the VMS 200 is stored, according to another embodiment of the present invention.

As before, the surveillance data store 220 stores the surveillance data and time information associated with the surveillance data. Now, however, for each block of surveillance block of surveillance data, a counter is additionally stored. The counter is a number representing age information for the block of surveillance data in terms of the VMS uptime. More specifically, in different embodiments, the counter represents the amount of uptime (e.g. days, hours) that has elapsed since the block was recorded (similar to the adjusted age) or the amount of uptime that remains before the block is deleted. When new blocks of surveillance data are stored, the value of the counter is initialized to a predetermined value (e.g. 0 or 14). The data retention module 216 increments or decrements the counter at predetermined intervals only during periods of uptime and deletes all blocks of surveillance data with counters that have values equal to a predetermined value based on the data retention settings of the VMS 200.

In the illustrated embodiment, the counters are stored associated with the blocks of surveillance data in a counter table 260, which includes columns for block ID, camera ID, and the counter. For example, block with a block ID of "block01" was generated by "camera1" and has a counter value of "14". Depending on the specific embodiment, this value could indicate that the block has existed for 14 days' worth of uptime or that the block is newly created and initialized, with 14 days' worth of uptime left before it is deleted.

Figure 6:
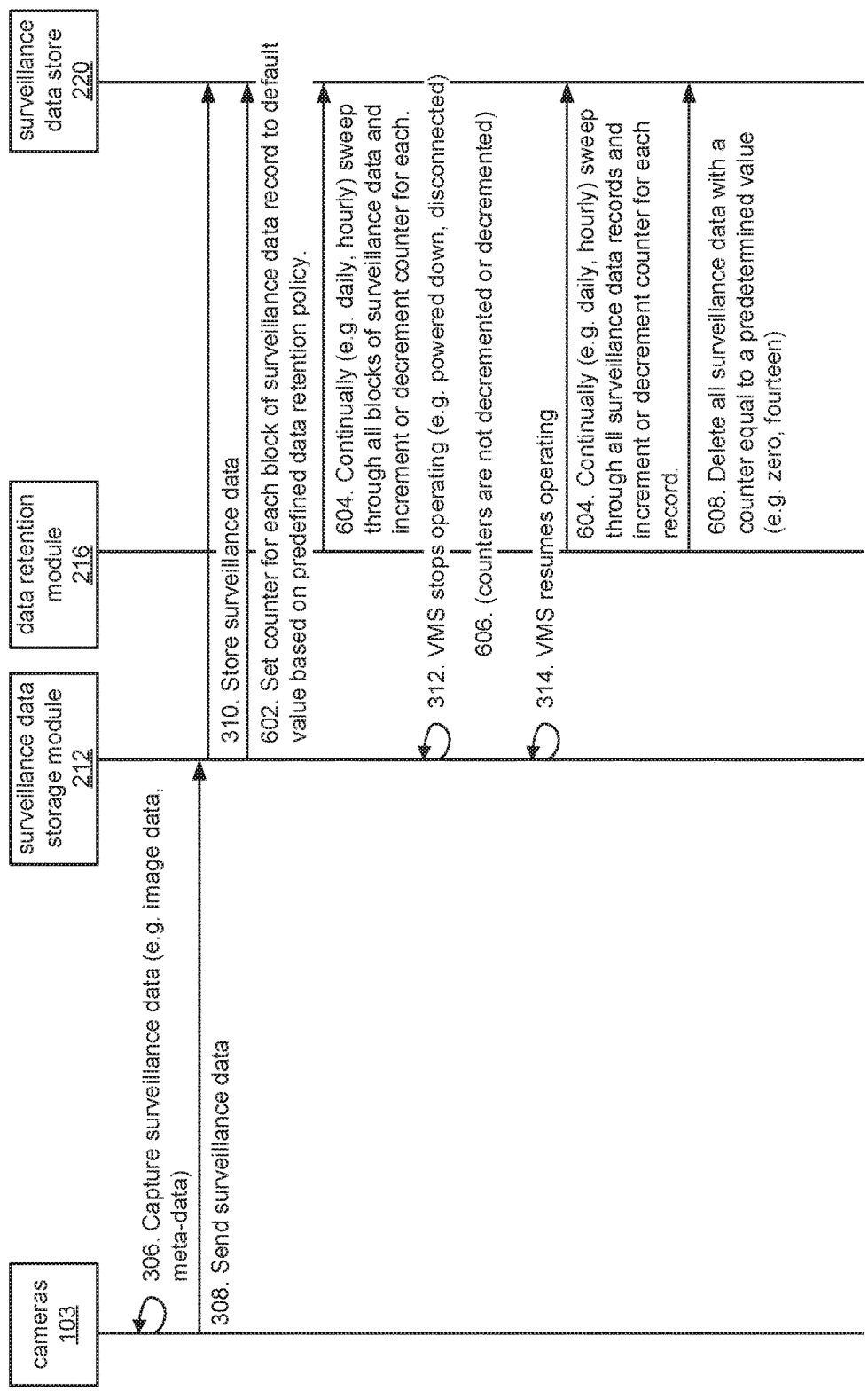
FIG. 6 is a sequence diagram illustrating how the storage server stores the surveillance data along with an associated counter that is set at a default value, continually increments or decrements the counter during uptime only, and then discards the surveillance data based on the value of the counter and predetermined data retention settings.

FIG. 6 is a sequence diagram illustrating how the storage server 230 stores the surveillance data along with an associated counter that is set at a default value, continually increments or decrements the counter during uptime only, and then discards the surveillance data based on the value of the counter and predetermined data retention settings.

Steps 306 through 310 proceed as previously described.

Now, however, in step 602, the surveillance data storage module 212 sets a counter for each block of surveillance data to a default value based on predetermined data retention settings of the VMS 200. In step 604, the counter for each block of surveillance data is continually incremented or decremented (e.g. on a daily or hourly basis).

In step 312, the VMS 200 stops operating as previously described.

In step 606, none of the counters are incremented or decremented while the VMS 200 is in a period of downtime.

In step 314, the VMS 200 resumes operating as previously described, at which point step 604 repeats, and the counters continue to be incremented or decremented during the period of uptime.

Finally, in step 608, the data retention module 216 deletes all blocks of surveillance data with counters that have values equal to a predetermined value.

In one example, the counter for each block is set at 0 and continually incremented only during periods of uptime and not during periods of downtime, and then the block is deleted when the value of the counter is 14.

In another example, the counter for each block is set at 14, continually decremented only during periods of uptime and not during periods of downtime, and then the block is deleted when the value of the counter is 0.

Figure 7:
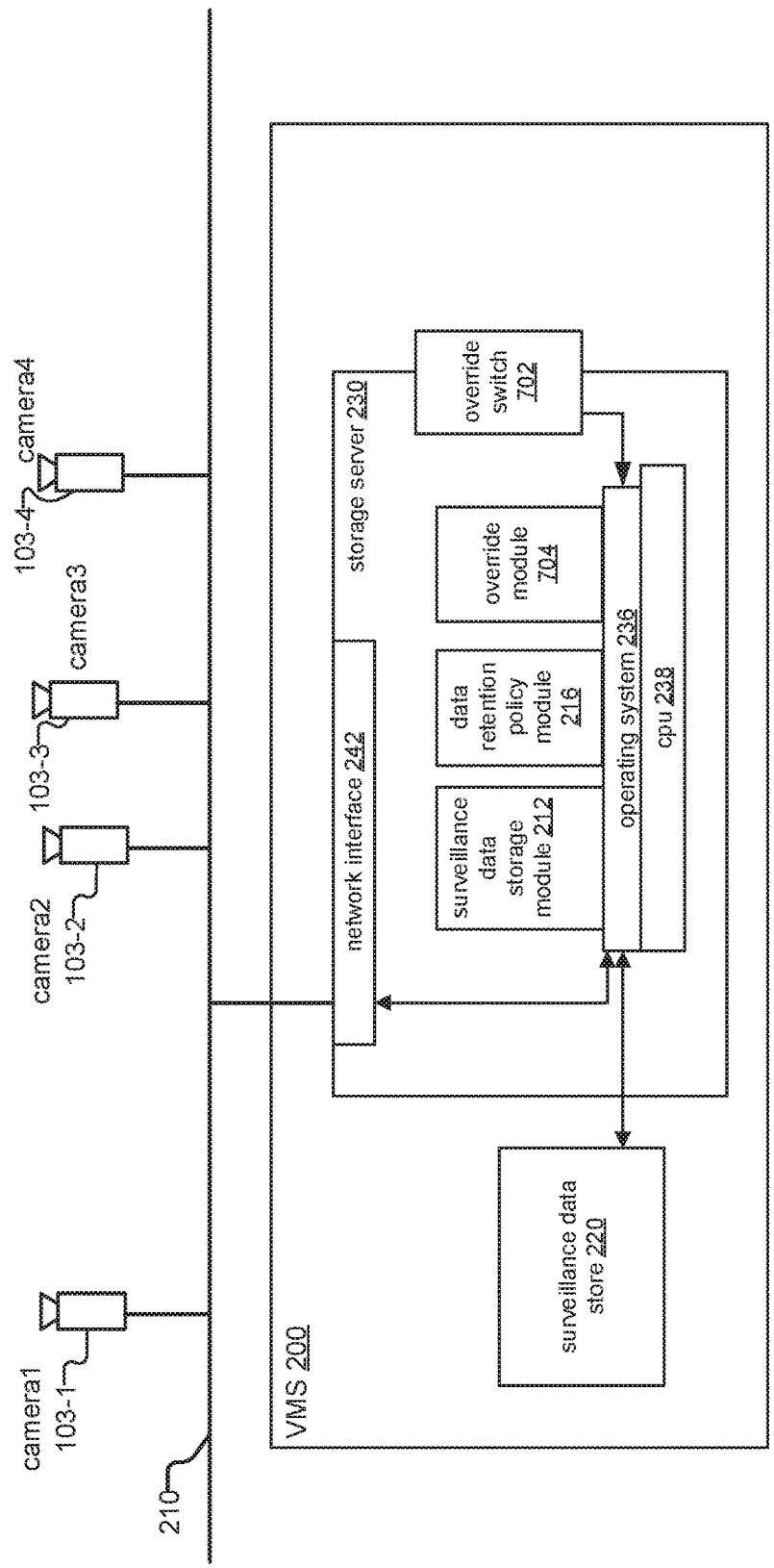
FIG. 7 is a schematic diagram of the VMS according to another embodiment in which an override switch determines whether surveillance data is discarded.

FIG. 7 is a schematic diagram of the VMS 200 according to another embodiment in which an override switch 702 determines whether surveillance data is discarded.

Here, the storage server 230 includes an external override switch 702, and an override module 704 executing on the CPU 238. In one example, the storage server 230 might be a rack mounted system. The override switch 702 would be a two position switch on the external housing of that storage server.

The override module 704 determines and returns override status information based on the physical status of the override switch 702 (e.g. which physical position the override switch 702 is currently in). More specifically, if the override module 704 detects that the override switch 702 is in a first position, the override status is returned as false, whereas if the override module 704 detects that the override switch 702 is in a second position, the override status is returned as true.

The override status determines whether the data retention module 216 deletes any surveillance data. If the override status is false, the data retention module 216 deletes surveillance data according to the data retention settings of the VMS 200. On the other hand, if the override status is true, no surveillance data is deleted by the data retention module 216.

Figure 8:
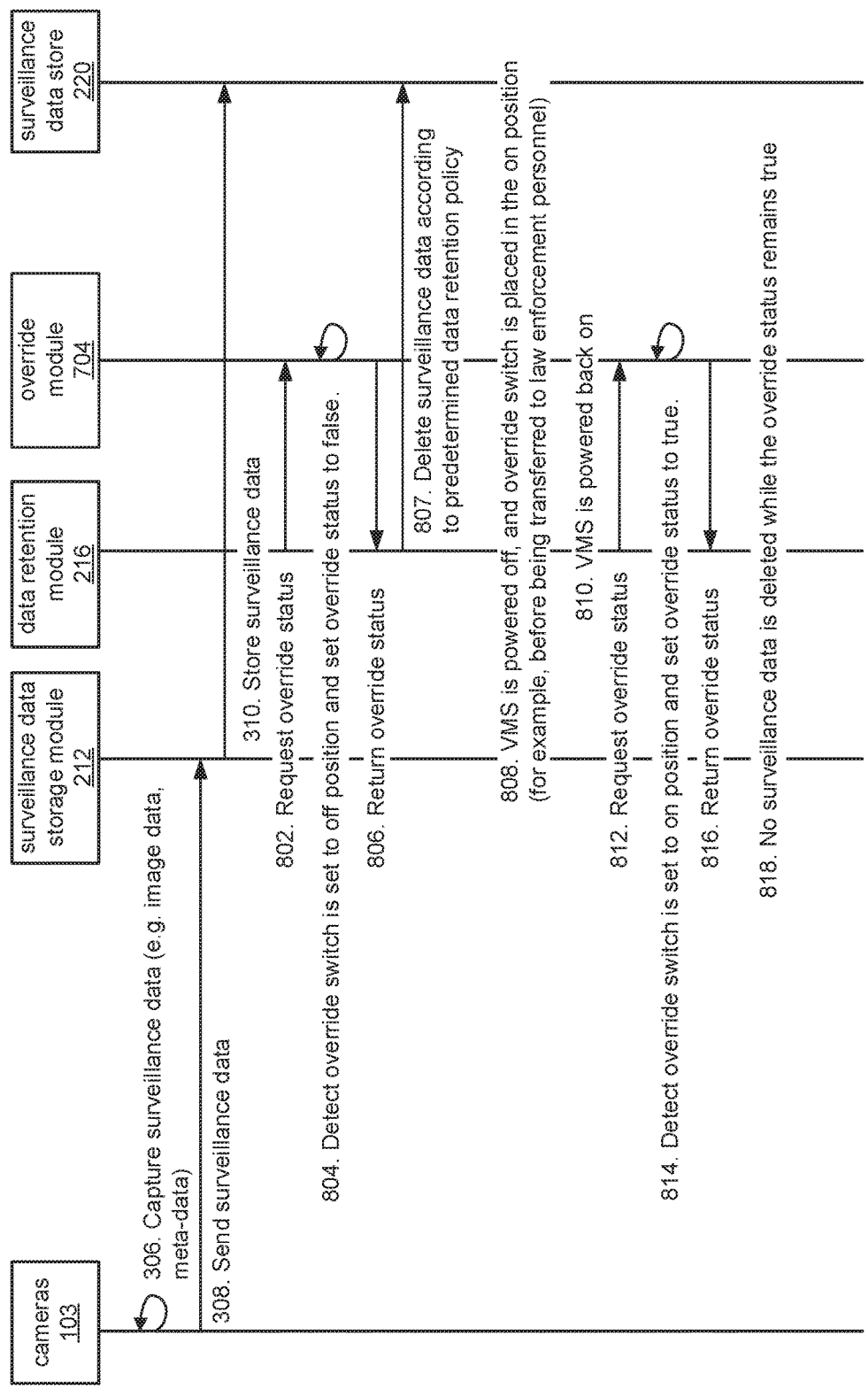
FIG. 8 is a sequence diagram illustrating how the storage server stores the surveillance data and discards the surveillance data based on the position of the override switch and the predetermined data retention settings.

FIG. 8 is a sequence diagram illustrating how the storage server 230 stores the surveillance data and discards the surveillance data based on the position of the override switch 702 and the predetermined data retention settings.

Steps 306 through 310 proceed as previously described.

Now, however, in step 802, the data retention module 216 requests the override status from the override module 704 (for example, in anticipation of deleting surveillance data).

In response, in step 804, the override module 704 detects that the override switch 702 is set to an off position and sets the override status to false. The override module 704 returns the override status in step 806.

In step 807, because the override status was false, the data retention module 216 deletes surveillance data according to the predetermined data retention settings of the VMS 200.

In step 808, the VMS 200 is powered-off, and the override switch 702 is placed in the on position (for example, before the VMS 200 is transferred to law enforcement personnel).

In step 810, the VMS 200 is powered-on.

In step 812, the data retention module 216 again requests the override status from the override module 704, and in response, in step 814, the override module 704 detects that the override switch 702 is set to the on position and sets the override status to true. The override module 704 returns the override status in step 816.

In step 818, no surveillance data is deleted by the data retention module 216 while the override status remains true.

Figure 9:
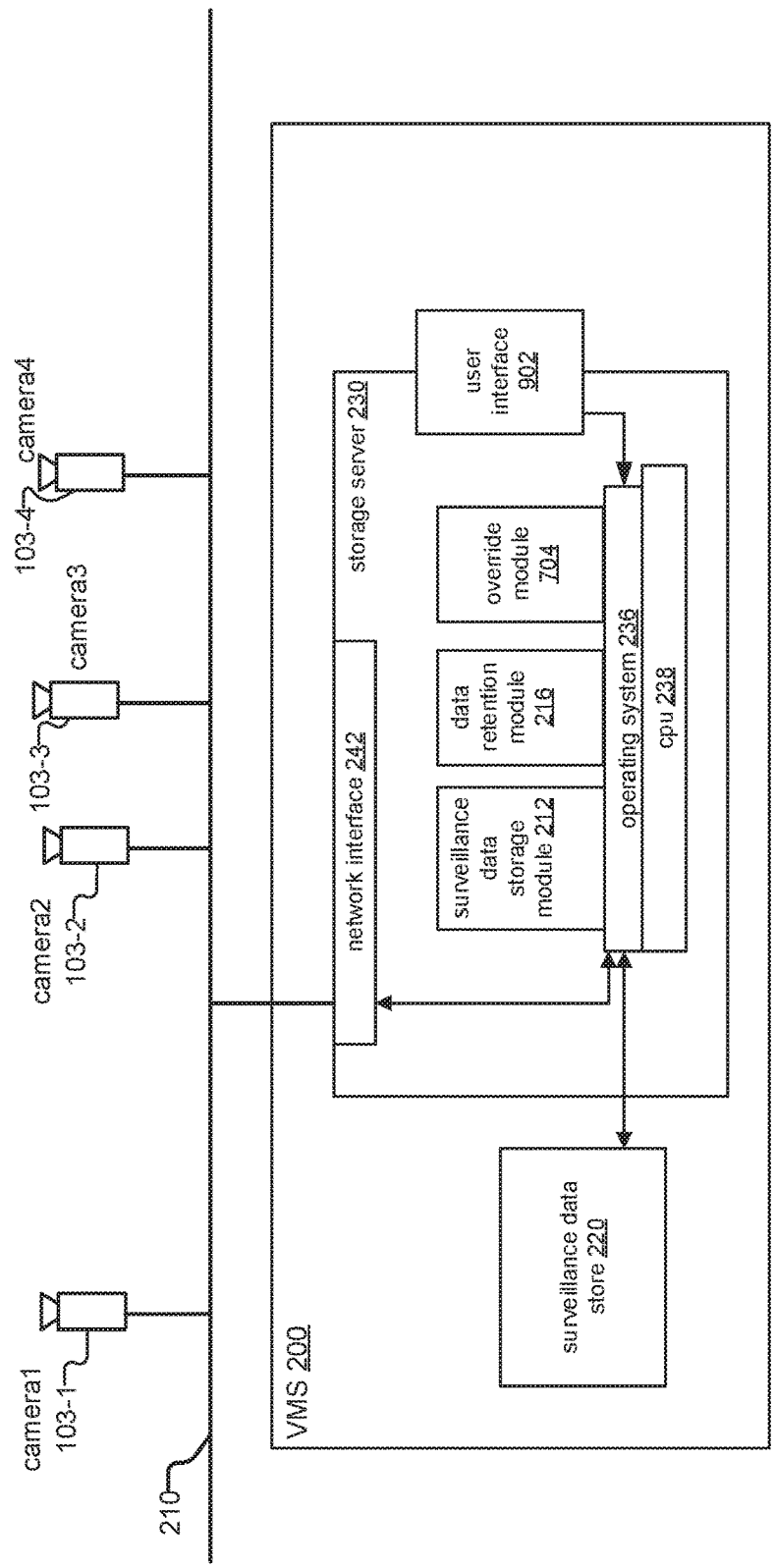
FIG. 9 is a schematic diagram of the VMS according to another embodiment in which a user interface (UI) determines whether surveillance data is discarded.

FIG. 9 is a schematic diagram of the VMS 200 according to another embodiment in which a user interface (UI) 902 determines whether surveillance data is discarded.

Here, instead of an external override switch 702, the storage server 230 includes a UI, including a keyboard, a mouse, and a display, among other examples. As before, the override module 704 determines and returns override status information based on input received from the UI 902 (e.g. a sequence of keystrokes, or a series of menu selections).

FIG. 10 is a sequence diagram illustrating how the storage server 230 stores the surveillance data and discards the surveillance data based on whether a predetermined input sequence is detected via the UI 902 before the VMS 200 is powered-off.

Steps 306 through 310 proceed as previously described.

Now, however, in step 910, the override status is set as false by default (for example, during normal operation).

The data retention module 216 retrieves the override status in steps 802 and 806 as previously described, and, in step 807, the data retention module 216 deletes the surveillance data as previously described.

In step 916, the override module 704 detects a predetermined input sequence via the UI 902 indicating that the override status should be set to true. In one example, the override module 704 detects a predetermined keypress or sequence of key presses. In another example, the override module 704 detects that a menu option has been selected (for example, on a graphical user interface). In response, the override status is set to true.

In step 918, the VMS 200 is powered-off (for example, before being transferred to law enforcement personnel), and in step 920, the VMS 200 is powered-back on.

Steps 812, 816 and 818 then proceed as previously described.

FIG. 11 is a sequence diagram illustrating how the storage server 230 stores the surveillance data and discards the surveillance data based on whether a predetermined input sequence is detected during a startup process of the VMS 200.

Steps 306 through 310, 910, 802, 806, 807, 918, and 920 proceed as previously described.

Now, however, during a startup procedure for the VMS 200 after it is powered-back on, the override module 704 detects a predetermined sequence via the UI 902 indicating that the override status should be set as true. In response, the override module 704 sets the override status as true.

Steps 814 through 816 then proceed as previously described.

The previously discussed embodiments concern data retention for surveillance data managed by a security and/or surveillance system including surveillance cameras. However, it should be noted that the invention can be applied to any system, in any industrial sector, where data retention is time based and where system outages could be justification for extending the lifetime of the data.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surveillance data management system, comprising:
   a surveillance data store for storing surveillance data from one or more surveillance cameras; and
   a storage server for directing storage of the surveillance data in the surveillance data store and generating age information of the surveillance data based on an operational status of the surveillance data management system and discarding the surveillance data based on the age information, and
   wherein the age information includes adjusted ages for the surveillance data based on differences between actual ages for the surveillance data and durations of downtime of the surveillance data management system.

2. The system as claimed in claim 1, wherein the actual ages for the surveillance data are determined based on when the surveillance data was generated.

3. The system as claimed in claim 1, wherein the durations of downtime of the surveillance data management system are determined based on when the most recent surveillance data was generated, when a current period of uptime started, when entries in a log were recorded, when recent graceful shutdowns occurred, and/or when a module for tracking the operational status last confirmed an uptime status.

4. The system as claimed in claim 1, wherein the storage server discards the surveillance data with the adjusted ages greater than a predetermined value.

5. The system as claimed in claim 1, wherein the age information is stored in counters for the surveillance data.

6. The system as claimed in claim 5, wherein the counters are set with predetermined default values when the surveillance data are first stored in the surveillance data store.

7. The system as claimed in claim 6, wherein the storage server increments or decrements the counters at predetermined intervals during periods of uptime.

8. The system as claimed in claim 7, wherein the storage server discards the surveillance data based on comparisons of the counters to a predetermined value.

9. The system as claimed in claim 1, wherein the surveillance data include image data, audio data and/or meta-data.

10. A method for managing storage of surveillance data of a surveillance data management system, the method comprising:
    storing the surveillance data from one or more surveillance cameras;
    generating age information of the surveillance data based on an operational status of the surveillance data management system; and
    discarding the surveillance data based on the age information,
    wherein the age information includes adjusted ages for the surveillance data based on differences between actual ages for the surveillance data and durations of downtime of the surveillance data management system.

11. The method as claimed in claim 10, further comprising determining the actual ages for the surveillance data based on when the surveillance data was generated.

12. The method as claimed in claim 10, further comprising determining the durations of downtime of the surveillance data management system based on when the most recent surveillance data was generated, when a current period of uptime started, when entries in a log were recorded, when recent graceful shutdowns occurred, and/or when a module for tracking the operational status last confirmed an uptime status.

13. The method as claimed in claim 10, further comprising discarding the surveillance data with the adjusted ages greater than a predetermined value.

14. The method as claimed in claim 10, further comprising storing the age information in counters for the surveillance data.

15. The method as claimed in claim 14, further comprising setting the counters with predetermined default values when the surveillance data are first stored.

16. The method as claimed in claim 15, further comprising incrementing or decrementing the counters at predetermined intervals during periods of uptime.

17. The method as claimed in claim 16, further comprising discarding the surveillance data based on comparisons of the counters to a predetermined value.

18. The method as claimed in claim 10, wherein the surveillance data include image data, audio data and/or meta-data.

19. A surveillance system, comprising:
    surveillance cameras generating surveillance data;
    a data store for storing the surveillance data; and
    a storage server for directing storage of the surveillance data in the data store and generating adjusted ages for the surveillance data based on differences between actual ages for the surveillance data and durations of downtime of the storage server and directing discarding of the surveillance data in the data store when the adjusted ages are greater than a predetermined value.

* * * * *